US011782415B2

(12) United States Patent
Bretschneider et al.

(10) Patent No.: US 11,782,415 B2
(45) Date of Patent: Oct. 10, 2023

(54) NUMERICAL CONTROLLER HAVING SCALABLE PERFORMANCE

(71) Applicant: Siemens Aktiengesellschaft, Munich (DE)

(72) Inventors: Jochen Bretschneider, Owingen (DE); Ralf Spielmann, Stuttgart (DE); Philippe Stellwag, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 583 days.

(21) Appl. No.: 16/982,424

(22) PCT Filed: Feb. 21, 2019

(86) PCT No.: PCT/EP2019/054348
§ 371 (c)(1),
(2) Date: Sep. 18, 2020

(87) PCT Pub. No.: WO2019/179716
PCT Pub. Date: Sep. 26, 2019

(65) Prior Publication Data
US 2021/0365001 A1 Nov. 25, 2021

(30) Foreign Application Priority Data

Mar. 20, 2018 (EP) .................................. 18162878

(51) Int. Cl.
*G05B 19/4063* (2006.01)
*G06F 9/50* (2006.01)
(Continued)

(52) U.S. Cl.
CPC ..... *G05B 19/4063* (2013.01); *G05B 19/4093* (2013.01); *G05B 19/4155* (2013.01); *G06F 9/50* (2013.01)

(58) Field of Classification Search
None
See application file for complete search history.

(56) References Cited

U.S. PATENT DOCUMENTS 7,814,366 B2 * 10/2010 Apparao ............... G06F 11/008
714/13
8,775,787 B2 * 7/2014 Axnix ..................... G06F 9/468
709/221
(Continued)

FOREIGN PATENT DOCUMENTS

| CN | 1722034 A | 1/2006 |
| CN | 102134940 A | 7/2011 |

(Continued)

OTHER PUBLICATIONS

Chen et al.; "System-on-Chip (SOC) Design forCNC System"; IEEE International Symposium on Industrial Electronics (ISIE 2009); (Chen_2009.pdf; pp. 690-693) (Year: 2009).*
(Continued)

*Primary Examiner* — Hiren P Patel
(74) *Attorney, Agent, or Firm* — Henry M. Feiereisen LLC

(57) ABSTRACT

A system program monitors a numerical controller executing a useful program controlling a machine. The numerical controller determines target values for position-controlled axes and controls the position-controlled axes in accordance with the target values. The numerical controller stores resources and determines whether, and optionally to which extent, the resources are enabled or disabled. Enabling or disabling the resources specifies how many processor cores are enabled for use, or how many processor threads are enabled for use, or to what extent a processor cache or a processor main memory are enabled for use, or which hardware components of the numerical controller are enabled for use, or to what extent use of external computing (Continued)

power is permitted. The numerical controller determines the target values for the position-controlled axes using only the enabled resources.

9 Claims, 2 Drawing Sheets

(51) Int. Cl.
  *G05B 19/4093* (2006.01)
  *G05B 19/4155* (2006.01)

(56) References Cited

U.S. PATENT DOCUMENTS

| | | | | |
|---|---|---|---|---|
| 9,027,029 | B2* | 5/2015 | Lonappan | G06F 9/50 |
| | | | | 712/34 |
| 9,779,058 | B2* | 10/2017 | Barroso | G06F 15/80 |
| 2002/0049512 | A1 | 4/2002 | Mizuno et al. | |
| 2004/0236852 | A1* | 11/2004 | Birkestrand | G06F 9/5077 |
| | | | | 705/51 |
| 2005/0283269 | A1 | 12/2005 | Genma et al. | |
| 2006/0174007 | A1* | 8/2006 | Birkestrand | G06F 9/5077 |
| | | | | 709/226 |
| 2008/0256363 | A1* | 10/2008 | Balacheff | G06F 21/572 |
| | | | | 713/187 |
| 2011/0154348 | A1* | 6/2011 | Elnozahy | G06F 21/10 |
| | | | | 718/104 |
| 2013/0041510 | A1* | 2/2013 | Kurakake | G05B 19/4141 |
| | | | | 700/275 |
| 2013/0131840 | A1* | 5/2013 | Govindaraj | G05B 19/41845 |
| | | | | 700/19 |
| 2013/0268942 | A1* | 10/2013 | Duluk, Jr. | G06F 9/4881 |
| | | | | 718/104 |
| 2015/0094846 | A1 | 4/2015 | Hamm et al. | |
| 2015/0378341 | A1* | 12/2015 | Kobayashi | G05B 19/19 |
| | | | | 700/186 |
| 2016/0062348 | A1* | 3/2016 | Ogino | G05B 19/4141 |
| | | | | 700/2 |
| 2017/0139403 | A1* | 5/2017 | Saitou | G05B 19/406 |
| 2017/0199770 | A1* | 7/2017 | Peteva | G06F 9/5088 |
| 2018/0004191 | A1 | 1/2018 | Rosenbaum | |
| 2018/0059650 | A1 | 3/2018 | Rickfjord | |
| 2019/0121324 | A1* | 4/2019 | Endou | G05B 19/4155 |

FOREIGN PATENT DOCUMENTS

| | | |
|---|---|---|
| CN | 104516309 A | 4/2015 |
| EP | 2779009 A2 | 9/2014 |
| EP | 3 045 993 A1 | 7/2016 |

OTHER PUBLICATIONS

Ekkachai et al.; "Design and Development of an Open Architecture CNC Controller for Milling Machine Retrofitting"; International Joint Conference 2009, Japan; (Eddachai_2009.pdf; pp. 5629-5632) (Year: 2009).*

Keinert et al.; "Concept of a Computerized Numerical Control Kernel for Execution on Multi-core Processors"; IEEE Advanced Motion Control Apr. 22-24, 2016 Auckland New Zealand; (Keinert_2016.pdf; pp. 1-6) (Year: 2016).*

Petko et al.; "CNC system of the 5-axis hybrid robot for milling"; http://dx.doi.org/10.1016/j.mechatronics.2016.03.001; 2016 Elsevier Ltd.; (Petko_2016.pdf; pp. 89-99) (Year: 2016).*

Landers et al: "Reconfigurable Machine Tools", CIRP Annals, Elsevier BV, BL, CH, FR, vol. 50, No. 1, Seiten 269-274, XP022137388, ISSN: 0007-8506, DOI:10.1016/S0007-8506(07)62120-9; pp. 3; 2001.

PCT International Search Report and Written Opinion of International Searching Authority dated Jul. 19, 2019 corresponding to PCT International Application No. PCT/EP2019/054348 filed Feb. 21, 2019.

* cited by examiner

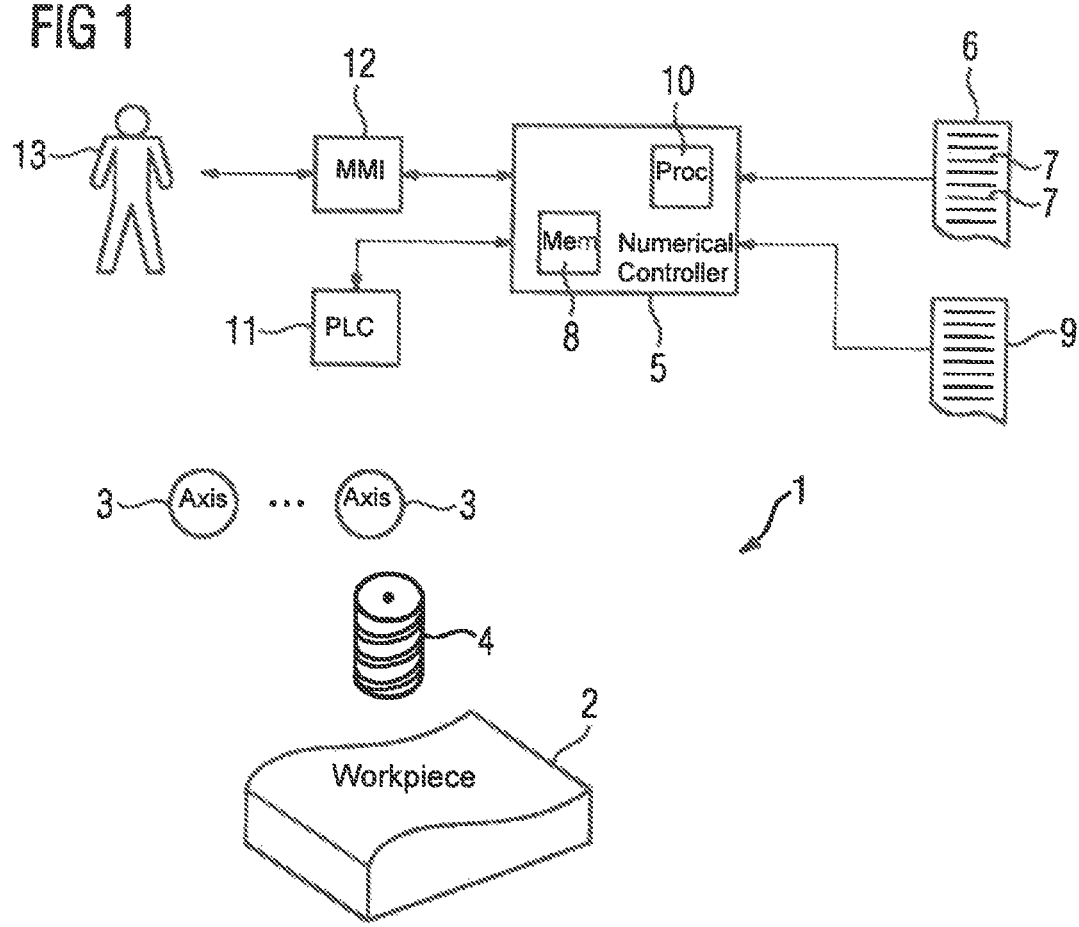
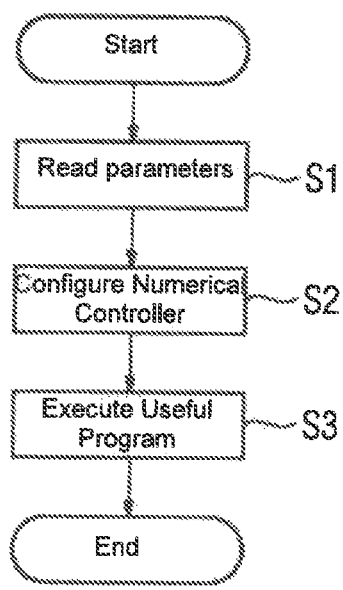

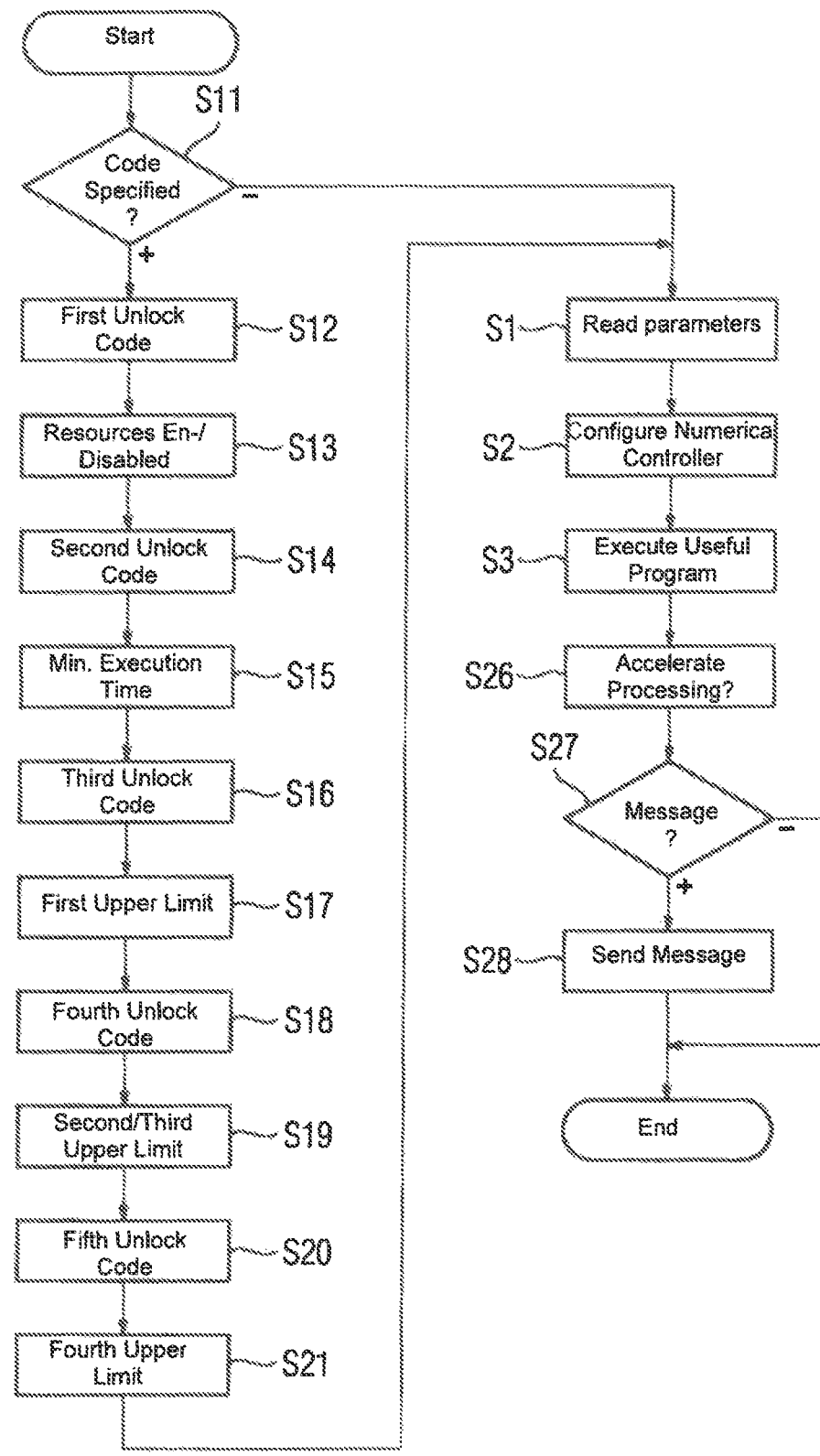

NUMERICAL CONTROLLER HAVING SCALABLE PERFORMANCE

CROSS-REFERENCES TO RELATED APPLICATIONS

This application is the U.S. National Stage of International Application No. PCT/EP2019/054348, filed Feb. 21, 2019, which designated the United States and has been published as International Publication No. WO 2019/179716 A1 and which claims the priority of European Patent Application, Serial No. 18162878.5, filed Mar. 20, 2018, pursuant to 35 U.S.C. 119(a)-(d).

BACKGROUND OF THE INVENTION

The present invention is based on an operating method for a numerical controller,
  wherein the numerical controller executes a useful program while being monitored by a system program,
  wherein, in the course of the execution of the useful program, the numerical controller determines, by means of at least one processor having at least one first dock rate, target values for position-controlled axes of a machine controlled by the numerical controller and actuates the position-controlled axes in accordance with the respectively determined target values.

The present invention is furthermore based on a system program for a numerical controller, wherein the system program comprises machine code, which can be processed by the numerical controller, wherein the processing of the machine code by the numerical controller causes the numerical controller to execute such an operating method.

The present invention is furthermore based on a numerical controller, wherein the numerical controller is programmed with such a system program so that it executes such an operating method.

Many performance classes of numerical controller systems are available on the market. The scaling of the performance can, for example, relate to the number of technologies provided (turning, milling, laser machining, etc.), the number of controllable axes, the type and scope of activatable controller functions and so on. Furthermore, the external performance features mentioned above by way of example are, as a rule, also accompanied by increasing requirements relating to the performance features of the controller systems such as, for example, the performance of a processor of the numerical controller or the amount of main memory available and the like. Manufacturers of production machines (for example machine tools) obtain and use numerical controllers of a specific performance class that they deem to be suitable.

In the course of later modifications, manufacturers of production machines are bound by the limitations of the numerical controllers they use. If there is subsequently a requirement for higher performance—for example higher machining accuracy, which is achieved by a shorter interpolation time according to the prior art, this can only be achieved by replacing the numerical controller with a correspondingly more powerful numerical controller or by accepting extended machining time. The use of a more powerful numerical controller entails considerable costs and considerable outlay on commissioning. Conversely, if previous numerical controllers are to remain in use, these numerical controllers can only be achieved by accepting other restrictions, for example with respect to the achievable machining time.

Although is conceivably possible always to use a "large" and correspondingly powerful numerical controller, the acquisition of such large and correspondingly powerful numerical controllers is out of the question for production machine manufacturers for reasons of cost. Instead—at least as a rule they will only use numerical controllers that are "just adequate".

Conversely, manufacturers of numerical controllers could obviously market correspondingly "large" powerful numerical controllers at the same price as smaller, less powerful numerical controllers. However, this is unacceptable to manufacturers of numerical controllers for reasons of cost.

Therefore, in practice, manufacturers of production machines still remain bound to the limitations of the numerical controllers they are using in the course of later modifications.

A production system, which includes a production machine and a facility designated a control device is known from EP 3 045 993 A1. The production machine includes an internal CNC controller. The facility designated a control device is not incorporated in the real-time control of the production machine. Instead, its function is to use CAD data to determine a control program which will be later processed by the internal production machine controller. A plurality of functionalities are provided inside the facility designated as a control device, which, although they supply similar results these results are of varying quality. Higher grade functionalities can only be activated and used by means of a corresponding unlock code.

A control facility for a welding device is known from US 2018/0 059 650 A1. Various algorithms can be held in the control facility to control the welding device. If this is the case, the possible algorithms will be displayed to an operator to enable the operator to select one of the algorithms.

It is the object of the present invention to provide possibilities by means of which the performance of the numerical controller can be scaled, wherein both the interests of production machine manufacturers and the interests of numerical controller manufacturers are observed.

SUMMARY OF THE INVENTION

The object is achieved by an operating method as set forth hereinafter. Advantageous embodiments of the operating method are the subject matter of dependent claims.

According to the invention, an operating method of the type cited in the introduction is embodied in that,
  with regard to resources of the numerical controller, it is in each case recorded whether, and optionally within which scope, said resources are enabled or whether said resources are disabled,
  wherein enabling or disabling the resources establishes
    how many of a plurality of processor cores are enabled for use and/or
    how many of a plurality of processor threads are enabled for use and/or
    to what extent a processor cache and/or a main memory assigned to the processor are enabled for use and/or
    which hardware components of the numerical controller are enabled for use and/or
    to what extent the use of external computing power is permitted,
  that the numerical controller determines the target values for the position-controlled axes using only the enabled resources.

This procedure on the one hand enables manufacturers of numerical controllers to supply in principle very powerful numerical controllers at a reasonable price to production machine manufacturers. At the same time, it is still ensured that production machine manufacturers are only able to use numerical controllers within the scope of the performance features enabled by numerical controller manufacturers.

The establishment of which of the resources—optionally within which scope are enabled and which are disabled can be identified by numerical controller manufacturers according to the requirements. If production machine manufacturers pay a relatively low price, only a few resources are enabled or the enabled resources are limited. At higher prices, more resources are enabled or limitations removed. Here, as a rule, the more resources that are enabled and limitations removed, the higher the price paid by production machine manufacturers.

In a preferred embodiment of the operating method, it is provided that, in the course of the execution of the system program, but before the execution of the useful program, the numerical controller receives a first unlock code from an operator or from a computer-controlled facility and identifies which of the resources are enabled within which scope and which of the resources are disabled in dependence on the received first unlock code. This also enables resources to be unlocked subsequently as required.

Similar procedures can be implemented for the use of resources with respect to other performance parameters of the numerical controller. It is in particular possible for minimum execution times for repeatedly executed actions within the controller relating to the useful program to be recorded in the numerical controller and that, in the course of the execution of the useful program, the numerical controller executes the actions within the controller with at least the respective minimum execution time.

Here, it is again possible for, in the course of the execution of the system program, but before the execution of the useful program, the numerical controller to receive a second unlock code from an operator or from a computer-controlled facility and to identify the minimum execution times in dependence on the received second unlock code. This also enables the performance of the numerical controller to be scaled subsequently with respect to the actions within the controller.

In a similar manner, it is also possible for a first upper limit for the at least one first clock rate (frequency) to be recorded in the numerical controller and for, in the course of the execution of the useful program, the numerical controller to limit the first clock rate to the first upper limit.

Here it is also again possible for, in the course of the execution of the system program, but before the execution of the useful program, the numerical controller to receive a third unlock code from an operator or from a computer-controlled facility and to identify the first upper limit in dependence on the received third unlock code. This also enables the performance of the numerical controller to be scaled subsequently with respect to the first clock rate.

It is also possible for, in the course of the execution of the useful program, the numerical controller to communicate with an external facility with a second clock rate and/or with a communication bandwidth and for a second upper limit for the second clock rate and/or a third upper limit for the communication bandwidth to be recorded in the numerical controller.

Here, it is also again possible for, in the course of the execution of the system program, but before the execution of the useful program, the numerical controller to receive a fourth unlock code from an operator or from a computer-controlled facility and to identify the second upper limit and/or the third upper limit in dependence on the received fourth unlock code. As a result, here the corresponding scaling is also still possible subsequently.

In a similar manner it is possible for the processor to work with a processor clock rate, for a fourth upper limit for the processor clock rate to be recorded in the numerical controller and for, in the course of the execution of the useful program, the numerical controller to limit the processor clock rate to the fourth upper limit.

Here, it is also again possible for, in the course of the execution of the system program, but before the execution of the useful program, the numerical controller to receive a fifth unlock code from an operator or from a computer-controlled facility and to identify the fourth upper limit in dependence on the received fifth unlock code. As a result, here the corresponding scaling is also still possible subsequently.

The object is furthermore achieved by a system program for a numerical controller, wherein the system program comprises machine code, which can be processed by the numerical controller, wherein the processing of the machine code by the numerical controller causes the numerical controller to execute an method set forth above. According to the invention, the processing of the machine codes by the numerical controller causes the numerical controller to execute an operating method according to the invention.

The object is furthermore achieved by a numerical controller which is programmed with a system program according to the invention so that the numerical controller executes an operating method according to the invention.

BRIEF DESCRIPTION OF THE DRAWING

The above-described properties, features and advantages of this invention and the manner in which they are achieved will become clearer and more plainly comprehensible in conjunction with following description of the exemplary embodiments explained in more detail in conjunction with the drawings. These show in schematic depictions:

FIG. 1 a production machine,
FIG. 2 a flowchart, and
FIG. 3 a further flowchart.

DETAILED DESCRIPTION OF PREFERRED EMBODIMENTS

According to FIG. 1, a production machine 1 is to manipulate, for example machine, a workpiece 2. For this purpose, the production machine has a number of position-controlled axes 3 by means of which, for example, a tool 4 can positioned in a position-controlled manner relative to the workpiece 2. The positioning can be translatory and/or rotatory. There can be as many position-controlled axes 3 as required. Often, there are at least three position-controlled axes 3. However, embodiments with more or fewer than three position-controlled axes are also possible.

A numerical controller 5 is provided to control production machine 1. The numerical controller 5 is programmed with a system program 6. The system program 6 comprises machine code 7, which can be processed by the numerical controller 5. The processing of the machine code 7 by the numerical controller 5 causes the numerical controller 5 to execute an operating method which is explained in more detail below in conjunction with FIG. 2.

According to FIG. 2, initially, the numerical controller 5 only executes the system program 6. This state can, for example, occur on start-up or after a reset of the numerical controller 5. In the context of the execution of the system program 6, in a step St the numerical controller 5 reads out various parameters from a configuration memory 8. In a step S2, the numerical controller 5 is configured in accordance with the parameters that are read out. The configurations made will be discussed in more detail later.

After configuration, in a step S3, the numerical controller 5 starts to execute a useful program 9. The useful program 9 can, for example, be a conventional parts program comprising corresponding sequences or target position values for the individual position-controlled axes 3. The numerical controller 5 executes the useful program 9 while being monitored by the system program 6.

In the context of the execution of the useful program 9, the numerical controller 5 determines, by means of at least one processor 10 having at least one first clock rate, target values for the position-controlled axes 3. It furthermore actuates the position-controlled axes 3 in accordance with the respectively determined target values. The first clock rate can, for example, be an IPO clock rate interpolation clock rate), a position-control clock rate, a speed-control dock rate or current-control clock rate. Other technology-related clock rates are possible. Technology-related clock rates are clock rates, which are related to the processing of the target values determined using the useful program 9. The opposite are control-related clock rates, which only relate to the internal functioning of the numerical controller 5. The unit of the first dock rate is hertz. The higher the first dock rate, the more quickly—with otherwise unchanged conditions—the useful program 9 can be processed.

The parameters recorded in the numerical controller can, for example, establish which resources of the numerical controller 5 are enabled and which are disabled. If intermediate stages between complete saving and complete enabling are possible, the recorded parameters can also establish the scope within which the resources are enabled. If the processor 10 is embodied as a multi-core processor, the cores of the processor 10 are an example of such resources. The parameters can, for example, establish whether, in the case of a quad-core processor, only one single processor core thereof, two processor cores thereof or all four processor cores thereof are used. Similar statements obviously also apply to processors 10 with a different number of processor cores, for example 2, 8 or 16 processor cores. Another example in this case are the individual processor threads 10. The parameters can, for example, establish whether, in the case of a maximum of eight possible threads, only one single thread is used or whether two, four or eight threads are used. Similar statements obviously also apply to processors 10 with a different number of threads, for example 4 or 16 threads. A further example consists in establishing whether, when a 4 MB cache is physically present, nothing, 1 MB, 2 MB or all 4 MB are used. A further example consists in establishing whether, in the case of two cache levels being present, one cache level is used or whether two cache levels are used. A further example consists in establishing whether, when a 4 GB main memory is physically present, 1 GB, 2 GB or all 4 GB are used. A further example consists in establishing whether a GPU (=graphical processing unit) that is present is used or not. Other functional units, for example a DSP (digital signal processor) or fixed-programmed modules (for example ASICs or FPGAs), can be unlocked or disabled as required.

The above statements are obviously by way of example only. Furthermore, it is not only possible to enable or block internal resources of the numerical controller 5 (completely or partially). Similar procedures are also possible for external resources of the numerical controller 6. For example, the parameters can power can be used—for example by another numerical controller or via a cloud.

The parameters can furthermore establish the minimum execution time with which repeatedly executed actions within the controller relating to the useful program 9 are executed, i.e. the minimum time elapsing between two such actions that follow in direct succession. An example of such an execution time is the block change-over time, i.e. the time between the loading of two successive data blocks of the useful program 9. For example, the parameters may not limit a minimum possible block change-over time of 1 ms due to the performance of the numerical controller 5, limit it to 2 ms or limit it to 4 ms.

The parameters can furthermore establish a first upper limit for the at least one first clock rate. For example, the parameters may not limit a maximum possible position-control clock rate of 4 kHz due to the performance of the numerical controller 5, limit it to 2 kHz or limit it to 1 kHz.

Furthermore, in the context of execution of the useful program 9, the numerical controller 5 often communicates with other facilities, for example with a stored program control 11 (often called PLC=progmmmable logic control) or other facilities, such as, for example a man-machine-interface 12. Communication with a further numerical controller via a corresponding machine-machine-interface is also possible. As a rule, such communication via the machine-machine-interface usually takes place with a very high or wide communication bandwidth.

As a rule, communication with the stored program control 11 generally takes place at a second dock rate. As a rule, communication with the man-machine interface 12 takes place with a communication bandwidth. The parameters can, for example, establish a second upper limit for the second clock rate. For example, the parameters may not limit a possible maximum second clock rate of 200 Hz due to the performance of the numerical controller 5, limit it to 100 Hz or limit it to 50 Hz. Alternatively or additionally, the parameters can, for example, establish a third upper limit for the communication bandwidth. For example, the parameters may not limit a possible maximum communication bandwidth of 1 Mbit/s due to the performance of the numerical controller 5, omit it to 500 kbit/s or limit it to 250 kbit/s.

The processor 10 works with a processor clock rate. The processor clock rate can be constant, for example 3.0 GHz. Alternatively, it can be variable, for example it can vary between 2.5 GHz and 3.0 GHz. Regardless of whether the processor dock rate is constant or variable, however, the parameters can establish a fourth upper limit for the processor dock rate, for example not limit the processor clock rate, limit it to 2.5 GHz or limit it to 2.0 GHz.

In the course of the execution of step S3, the numerical controller 5 observes all the restrictions and limitations established by the parameters. In particular, the numerical controller 5 determines the target values for the position-controlled axes 3 using only the enabled resources. Furthermore, it executes the actions within the controller with at least the respective minimum execution time. Therefore, although the execution time can be longer than the minimum execution time specified by the parameters it cannot be shorter than this. Furthermore, it limits the first clock rate to the first upper limit, the second clock rate to the second upper limit and the communication bandwidth to the third upper limit. Finally, it limits the processor clock rate to the fourth upper limit.

The procedure explained above in conjunction with FIG. 2 is preferably embodied in accordance with FIG. 3.

FIG. 3 additionally includes steps S11 to S21. In step 311, the numerical controller 5 checks whether it is specified an overall code by an operator 13 or a computer-controlled facility. Optionally, it receives the overall code. If the overall code is not specified to it, the numerical controller 5 goes to step S1.

Otherwise, in step S12 the numerical controller 5 extracts a first unlock code from the overall code. In step S13, the numerical controller 5 identifies which of the resources— optionally within which scope are enabled and which of the resources are disabled in dependence on the received first unlock code. In particular, it changes the content of the configuration memory 8 accordingly.

In a similar manner, in step 314, the numerical controller 5 extracts a second unlock code from the overall code. In step S15, the numerical controller 5 identifies the minimum execution times in dependence on the received second unlock code. In particular, it changes the content of the configuration memory 8 accordingly.

In a similar manner, in step S16, the numerical controller 5 extracts a third unlock code from the overall code. In step S17, the numerical controller 5 identifies the first upper limit in dependence on the received third unlock code. In particular, it changes the content of the configuration memory 8 accordingly.

In a similar manner, in step S18, the numerical controller 5 extracts a fourth unlock code from the overall code. In step S19 the numerical controller 5 identifies the second upper limit and/or the third upper limit in dependence on the received fourth unlock code. In particular, it changes the content of the configuration memory 8 accordingly.

In a similar manner, in step 320, the numerical controller 5 extracts a fifth unlock code from the overall code. In step S21, the numerical controller 5 identifies the fourth upper limit in dependence on the received fifth unlock code. In particular, it changes the content of the configuration memory 8 accordingly.

As far as they are explained, steps S12 to S21 are all present. However, it is possible for individual pairs of steps S12 to S21 to be omitted.

Furthermore, in accordance with the depiction in FIG. 3, step S3 is preferably supplemented by a step S26. In step S26, the numerical controller 5, determines whether, and optionally within which scope, the processing of the useful program 9 could be accelerated if blocked resources or resources that are only usable to a limited extent are enabled, the minimum execution times are reduced, the at least one first clock rate is increased, the second clock rate is increased and/or the communication bandwidth is increased. Based on these determinations, the numerical controller 5 checks in a step S27 whether a corresponding message to the operator 13 or to a computer-controlled facility is advisable. If the numerical controller 5 reaches this conclusion, in a step S28, it sends the corresponding message to the operator 13 or the computer-controlled facility. This enables the corresponding unlock codes to be acquired and specified to the numerical controller 5. If the numerical controller 5 reaches the conclusion that such a message is not advisable, the corresponding message is not sent. The computer-controlled facility to which the message in step S27 is sent can be the same as or different from the computer-controlled facility, which specifies the overall code, according to requirements.

The procedure according to the invention enables, for example, a faster IPO clock rate to be implemented if, and only if, non-rotationally symmetrical machining is to be performed during a turning operation. This is because such a case requires a very short IPO clock rate to enable the out-of-roundness to be interpolated with sufficient precision even at a relatively high spindle speed. For example, in order to enable a sufficiently fast IPO clock rate to be achieved, simultaneous parallel machining on a plurality of processor cores of the processor 10 may be necessary. In this case, it is, for example, possible for all four processor cores of a quadcore processor to be unlocked on the basis of a corresponding first unlock code.

Similarly, by means of a corresponding enablement, part of a so-called block preparation can be outsourced to an additional processor core in order to enable this to be calculated and processed more quickly, more precisely or in another improved manner. In this case, it is, for example, possible for two of the four processor cores of a quadcore processor to be unlocked on the basis of a corresponding first unlock code.

Thus, in summary the present invention relates to the following:

A numerical controller 6 executes a useful program 9 while being monitored by a system program 6. In the course of the execution of the useful program 9, the numerical controller 5 determines, by means of at least one processor 10 having at least one first clock rate, target values for position-controlled axes 3 of a machine 1 controlled by the numerical controller 5 and actuates the position-controlled axes 3 in accordance with the respectively determined target values. With regard to resources of the numerical controller 5, it is in each case recorded in the numerical controller 5 whether, and optionally within which scope, said resources are enabled or whether said resources are disabled. Enabling or disabling the resources establishes how many of a plurality of processor cores 10 are enabled for use and/or how many of a plurality of processor 10 threads are enabled for use and/or to what extent a processor 10 cache and/or a main memory assigned to the processor 10 are enabled for use and/or which hardware components of the numerical controller 5 are enabled for use and/or to what extent the use of external computing power is permitted. The numerical controller 5 determines the target values for the position-controlled axes 3 using only the enabled resources.

The present invention has many advantages. In particular, it is easily possible to scale the performance of a numerical controller 5 as required. An advantage for production machine manufacturers is that is only necessary to replace the numerical controller 5 in exceptional cases. The advantage for numerical controller 5 manufacturers is that the outlay for the hardware development of numerical controllers 5 can be reduced since fewer different numerical controllers 5 have to be developed. On the one hand, production machine 1 manufacturers only have to pay for the performance features that they, actually use, while the numerical controllers 5 still have considerable potential for expansion.

Although the invention has been illustrated and described in greater detail by the preferred exemplary embodiment, the invention is not restricted by the disclosed examples and other variations can be derived herefrom by the person skilled in the art without departing from the scope of protection of the invention.

The invention claimed is:

1. A method for operating a numerical controller which executes a useful program controlling a machine, the method comprising:
   executing a system program which monitors the numerical controller;
   the numerical controller determining, with a processor having a first clock rate and by executing the useful program, target values for position-controlled axes of the machine and actuating the position-controlled axes in accordance with the determined target values;

storing in the numerical controller criteria for deciding which and to which extent resources of the numerical controller are enabled or disabled, wherein enabling or disabling the resources specifies
- a number of processor cores of the at least one processor to be enabled for use, or
- a number of processor threads of the at least one processor to be enabled for use, or
- an extent of a processor cache or of a main memory of the at least one processor to be enabled for use, or
- hardware components of the numerical controller to be enabled for use, or
- an extent of external computing power to be permitted; and the numerical controller determining the target values for the position-controlled axes using only the enabled resources based on unlock codes received, during execution of the system program, but before execution of the useful program, from an operator or from a computer-controlled facility, with a first of the unlock codes determining which of the resources are enabled and disabled, and to which extent the resources are enabled, with a second of the unlock codes determining a minimum execution time, and with a third of the unlock codes determining a first upper limit for the first clock rate for execution of the useful program.

2. The method of claim 1, further comprising the numerical controller storing the minimum execution time for repeatedly executed controller-internal actions of the useful program during execution of the useful program, and during execution of the useful program, executing the controller-internal actions at least with the minimum execution time.

3. The method of claim 1, further comprising the numerical controller storing the first upper limit for the first clock rate and limiting during execution of the useful program the first clock rate to the first upper limit.

4. The method of claim 1, further comprising the numerical controller communicating during execution of the useful program with an external facility with a second clock rate or with a communication bandwidth, and storing a second upper limit for the second clock rate or a third upper limit for the communication bandwidth.

5. The method of claim 4, further comprising the numerical controller receiving, during execution of the system program, but before execution of the useful program, a fourth unlock code from an operator or from a computer-controlled facility, and determining the second upper limit or the third upper limit in dependence on the received fourth unlock code.

6. The method of claim 1, further comprising the numerical controller storing a fourth upper limit for a processor clock rate of the processor, and limiting during execution of the useful program the processor clock rate to the fourth upper limit.

7. The method of claim 6, further comprising the numerical controller receiving, during execution of the system program, but before execution of the useful program, a fifth unlock code from an operator or from a computer-controlled facility, and determining the fourth upper limit based on the received fifth unlock code.

8. A system program for a numerical controller controlling a machine, wherein the system program comprises machine code embodied on a non-transitory storage medium, which when loaded into a memory of the numerical controller and executed by a processor of the numerical controller, causes the numerical controller to determine, with the processor having a first clock rate and by executing the useful program, target values for position-controlled axes of the machine and actuating the position-controlled axes in accordance with the determined target values, store criteria for deciding which and to which extent resources of the numerical controller are enabled or disabled, wherein enabling or disabling the resources specifies
- a number of processor cores of the at least one processor to be enabled for use, or
- a number of processor threads of the at least one processor to be enabled for use, or
- an extent of a processor cache or of a main memory of the at least one processor to be enabled for use, or
- hardware components of the numerical controller to be enabled for use, or
- an extent of external computing power to be permitted, and determine the target values for the position-controlled axes using only the enabled resources based on unlock codes received, during execution of the system program, but before execution of the useful program, from an operator or from a computer-controlled facility, with a first of the unlock codes determining which of the resources are enabled and disabled, and to which extent the resources are enabled, with a second of the unlock codes determining a minimum execution time, and with a third of the unlock codes determining a first upper limit for the first clock rate for execution of the useful program.

9. A numerical controller controlling a machine, wherein the numerical controller is programmed with a system program comprising machine code embodied on a non-transitory storage medium, which when loaded into a memory of the numerical controller and executed by a processor of the numerical controller, causes the numerical controller to determine, with the processor having a first clock rate and by executing the useful program, target values for position-controlled axes of the machine and actuating the position-controlled axes in accordance with the determined target values, store criteria for deciding which and to which extent resources of the numerical controller are enabled or disabled, wherein enabling or disabling the resources specifies
- a number of processor cores of the at least one processor to be enabled for use, or
- a number of processor threads of the at least one processor to be enabled for use, or
- an extent of a processor cache or of a main memory of the at least one processor to be enabled for use, or
- hardware components of the numerical controller to be enabled for use, or
- an extent of external computing power to be permitted, and determine the target values for the position-controlled axes using only the enabled resources based on unlock codes received, during execution of the system program, but before execution of the useful program, from an operator or from a computer-controlled facility, with a first of the unlock codes determining which of the resources are enabled and disabled, and to which extent the resources are enabled, with a second of the unlock codes determining a minimum execution time, and with a third of the unlock codes determining a first upper limit for the first clock rate for execution of the useful program.

* * * * *